United States Patent
Bharat et al.

(10) Patent No.: US 9,760,629 B1
(45) Date of Patent: Sep. 12, 2017

(54) SYSTEMS AND METHODS FOR IMPLEMENTING A NEWS ROUND TABLE

(75) Inventors: Krishna Bharat, San Jose, CA (US); Nathan Stoll, San Francisco, CA (US); Marissa Mayer, Palo Alto, CA (US)

(73) Assignee: GOOGLE INC., Mountain View, CA (US)

( * ) Notice: Subject to any disclaimer, the term of this patent is extended or adjusted under 35 U.S.C. 154(b) by 299 days.

(21) Appl. No.: 13/615,874

(22) Filed: Sep. 14, 2012

Related U.S. Application Data

(63) Continuation of application No. 11/023,962, filed on Dec. 29, 2004, now abandoned.

(51) Int. Cl.
G06F 17/30 (2006.01)

(52) U.S. Cl.
CPC .............. G06F 17/30705 (2013.01)

(58) Field of Classification Search
CPC ........... G06F 17/3071; G06F 17/30713; G06F 17/30864; G06F 17/30867; G06F 17/30675; G06F 17/30696; G06F 17/30705; G06Q 30/02
USPC ........................................................ 707/769
See application file for complete search history.

(56) References Cited

U.S. PATENT DOCUMENTS

| | | | |
|---|---|---|---|
| 5,940,821 A * | 8/1999 | Wical | |
| 6,078,924 A | 6/2000 | Ainsbury et al. | |
| 6,266,683 B1 * | 7/2001 | Yehuda et al. | 715/234 |
| 6,643,640 B1 | 11/2003 | Getchius et al. | |
| 6,658,626 B1 | 12/2003 | Aiken | |
| 6,839,680 B1 | 1/2005 | Liu et al. | |
| 7,031,952 B1 * | 4/2006 | Heumann et al. | |
| 7,035,864 B1 | 4/2006 | Ferrari et al. | |
| 7,062,487 B1 | 6/2006 | Nagaishi et al. | |
| 7,143,089 B2 | 11/2006 | Petras et al. | |
| 7,197,470 B1 | 3/2007 | Arnett et al. | |
| 7,275,061 B1 | 9/2007 | Kon et al. | |
| 7,376,635 B1 | 5/2008 | Porcari et al. | |
| 7,478,121 B1 * | 1/2009 | Nickerson et al. | 709/203 |
| 7,567,957 B2 | 7/2009 | Ferrari et al. | |
| 2002/0198866 A1 | 12/2002 | Kraft et al. | |
| 2003/0018659 A1 | 1/2003 | Fuks et al. | |
| 2003/0074368 A1 * | 4/2003 | Schuetze et al. | 707/103 R |
| 2004/0059783 A1 | 3/2004 | Kazui et al. | |
| 2004/0111467 A1 * | 6/2004 | Willis | G06F 17/30702 709/203 |
| 2004/0128215 A1 | 7/2004 | Florance et al. | |
| 2004/0236566 A1 | 11/2004 | Simske | |
| 2004/0260534 A1 | 12/2004 | Pak et al. | |
| 2004/0267686 A1 | 12/2004 | Chayes et al. | |

(Continued)

OTHER PUBLICATIONS

Co-pending U.S. Appl. No. 11/023,962 entitled "Systems and Methods for Implementing a News Round Table", by Krishna Bharat et al., filed Dec. 29, 2004, 45 pages.

*Primary Examiner* — Cam-Y Truong
(74) *Attorney, Agent, or Firm* — Patent Law Works LLP

(57) ABSTRACT

A system aggregates documents from multiple genres of data sources, where the multiple genres of data sources may include news sources, blogs, news groups, and discussion groups. The system groups the aggregated documents into one or more clusters, where each of the one or more clusters relates to a same topic. The system further classifies each of the one or more clusters into one or more taxonomies and archives each cluster with its respective classifications.

17 Claims, 13 Drawing Sheets

(56) References Cited

U.S. PATENT DOCUMENTS

| | | |
|---|---|---|
| 2005/0060312 A1 | 3/2005 | Curtiss et al. |
| 2005/0131932 A1 | 6/2005 | Weare |
| 2005/0165744 A1* | 7/2005 | Taylor et al. ............... 707/3 |
| 2005/0192999 A1 | 9/2005 | Cook et al. |
| 2005/0289039 A1* | 12/2005 | Greak ...................... 705/37 |
| 2006/0004703 A1 | 1/2006 | Spivack et al. |
| 2006/0004717 A1* | 1/2006 | Ramarathnam et al. ...... 707/3 |
| 2007/0100898 A1* | 5/2007 | Petras et al. ............... 707/200 |
| 2009/0327051 A1* | 12/2009 | Nerby ...................... 705/11 |

* cited by examiner

| STORY CLUSTER 415 | USER 1 420-1 | USER 2 420-2 | USER 3 420-3 | ... | USER M 420-M |
|---|---|---|---|---|---|
| CLUSTER_1 | COMMENTS, RATING | COMMENTS, RATING | < NO COMMENTS > | ... | < NO COMMENTS > |
| CLUSTER_2 | < NO COMMENTS > | COMMENTS, RATING | COMMENTS, RATING | ... | COMMENTS, RATING |
| CLUSTER_3 | COMMENTS, RATING | < NO COMMENTS > | < NO COMMENTS > | ... | COMMENTS, RATING |
| ... | ... | ... | ... | ... | ... |
| CLUSTER_N | COMMENTS, RATING | COMMENTS, RATING | COMMENTS, RATING | ... | < NO COMMENTS > |

STORY CLUSTER DATA TABLE 405

ENTRIES 410

FIG. 4

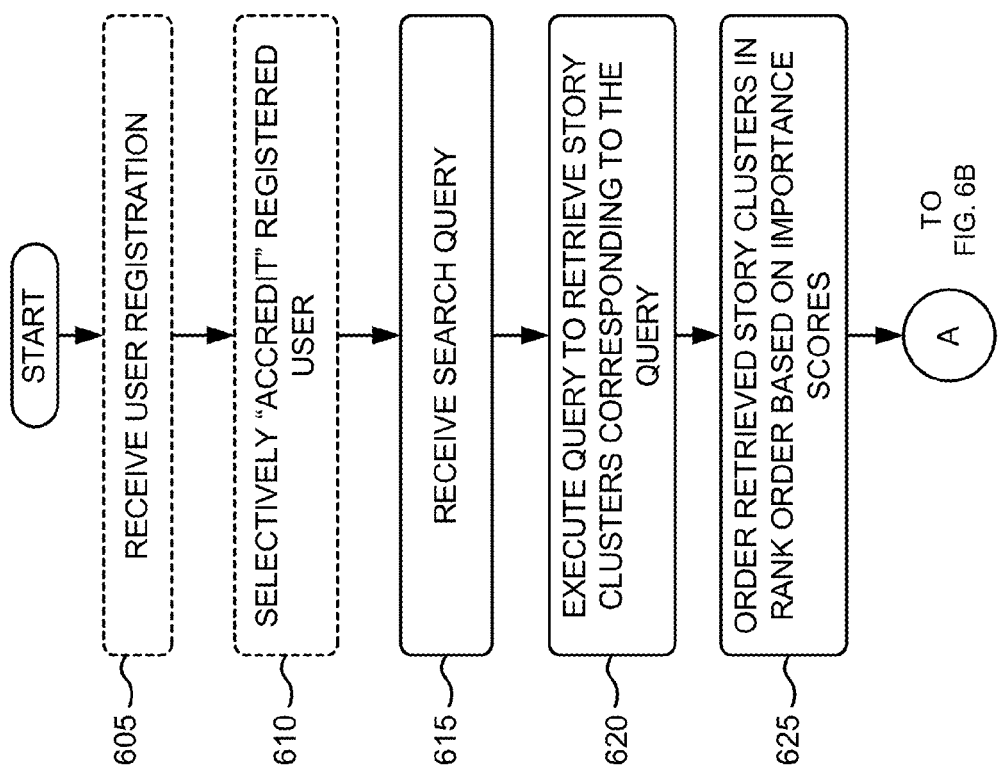

SYSTEMS AND METHODS FOR IMPLEMENTING A NEWS ROUND TABLE

RELATED APPLICATION

This application is a continuation of U.S. application Ser. No. 11/023,962, filed Dec. 29, 2004, the disclosure of which is incorporated herein by reference.

BACKGROUND OF THE INVENTION

Field of the Invention

Implementations consistent with principles of the invention relate generally to information aggregation systems and, more particularly, to systems and methods for aggregating news-related content from multiple different genres of sources.

Description of Related Art

Existing news aggregation services (e.g., Google News) search out, and aggregate, news content published on web pages throughout the Internet. In response to a search query from a user, or when a user browses a newspaper section of the news aggregation service, the news aggregation service presents a list of stories, from the aggregated news content, relevant to the query or to the newspaper section requested, with each story involving a group of articles from different publications dealing with the same topic.

On-line news reports and commentary tend to be authored in multiple locations on the web. Articles on the same topic tend to appear on various news sources, blogs, news groups and discussion forums. Recently, there have been web sites that aggregate news from multiple news sources (e.g., Google News, MSN Newsbot, Moreover, etc.) or multiple blogs (e.g., Daypop) to present a unified view. Also, there are sources that record the opinions of lay people on relevant topics (e.g., Google Groups, Slashdot, etc.). Taken in isolation, these multiple aggregators still do not provide a comprehensive record of what the world is saying about a certain issue or event in the news.

SUMMARY OF THE INVENTION

According to one aspect consistent with the principles of the invention, a method may include aggregating documents from multiple genres of data sources, where the multiple genres of data sources include at least two of news sources, blogs, news groups, and discussion forums. The method may further include grouping the aggregated documents into one or more clusters and providing access to the one or more clusters.

According to another aspect, a method may include aggregating documents from multiple different genres of data sources. The method may further include grouping the aggregated documents into one or more clusters and scoring each of the one or more clusters based on the genre of the data sources of each of the clusters.

According to a further aspect, a method may include aggregating documents from multiple data sources, where the multiple data sources include at least two of news sources, blogs, news groups, and discussion forums. The method may further include grouping the documents into one or more clusters, receiving multiple user comments related to a content of each of the one or more clusters, and storing the multiple user comments.

According to yet another aspect, a method may include aggregating documents from multiple genres of data sources, where the multiple genres of data sources include at least two of news sources, blogs, news groups, and discussion forums. The method may further include grouping the documents into one or more clusters and classifying the one or more clusters. The method may also include archiving the one or more clusters along with their respective classifications.

According to an additional aspect, a method may include obtaining a first document including news content and determining a second document related to the first document, the second document including commentary related to the news content. The method may also include archiving the first and second documents.

BRIEF DESCRIPTION OF THE DRAWINGS

The accompanying drawings, which are incorporated in and constitute a part of this specification, illustrate embodiments of the invention and, together with the description, explain the invention. In the drawings.

FIG. 4 is a diagram of an exemplary story cluster data table consistent with an aspect of the invention;

FIGS. 6A, 6B and 6C are flowcharts of an exemplary story cluster user comment aggregation process according to an implementation consistent with the principles of the invention;

DETAILED DESCRIPTION

The following detailed description of the invention refers to the accompanying drawings. The same reference numbers in different drawings may identify the same or similar elements. Also, the following detailed description does not limit the invention.

Systems and methods consistent with the principles of the invention implement a news-related data aggregation service in which news-related data from multiple different genres of sources, including, for example, news content sources, blogs, news group sources and discussion forums, is aggregated. The aggregated news-related data may be grouped into story clusters, where each story cluster is related to a same event or issue in the news. An importance score, determined based on a number of different factors including the genre of the source from which a document of a story cluster was retrieved, may be assigned to each story cluster. The story clusters may subsequently be accessed and viewed by users who, in turn, may provide user comments to comment on the content of selected ones of the story clusters. The user comments may be associated with the story clusters and subsequently provided to other users accessing and viewing the story clusters. These other users may rate the user comments based on, among other factors, the relevance, depth and/or usefulness of the user comments. Systems and methods consistent with principles of the invention, thus, provide a comprehensive record of what the world is saying about a certain issue or event in the news.

The comprehensive record provided by aspects of the invention permits sustained discussions on events or issues that recur. Consistent with principles of the invention, story clusters may be collected to create a persistent forum for the events or issues that correspond to the story clusters, thus, allowing continuous discussion on those events or issues even if there is not an immediate trigger in the news.

A "document," as the term is used herein is to be broadly interpreted to include any machine-readable and machine-storable work product. A document may include an e-mail, a web site, a file, a combination of files, one or more files with embedded links to other files, a news group posting, a blog, a web advertisement, etc. In the context of the Internet, a common document is a web page, or a portion of a web page. Web pages often include textual information and may include embedded information (such as meta information, images, hyperlinks, etc.) and/or embedded instructions (such as Javascript, etc.).

Exemplary Overview

Figure 1:
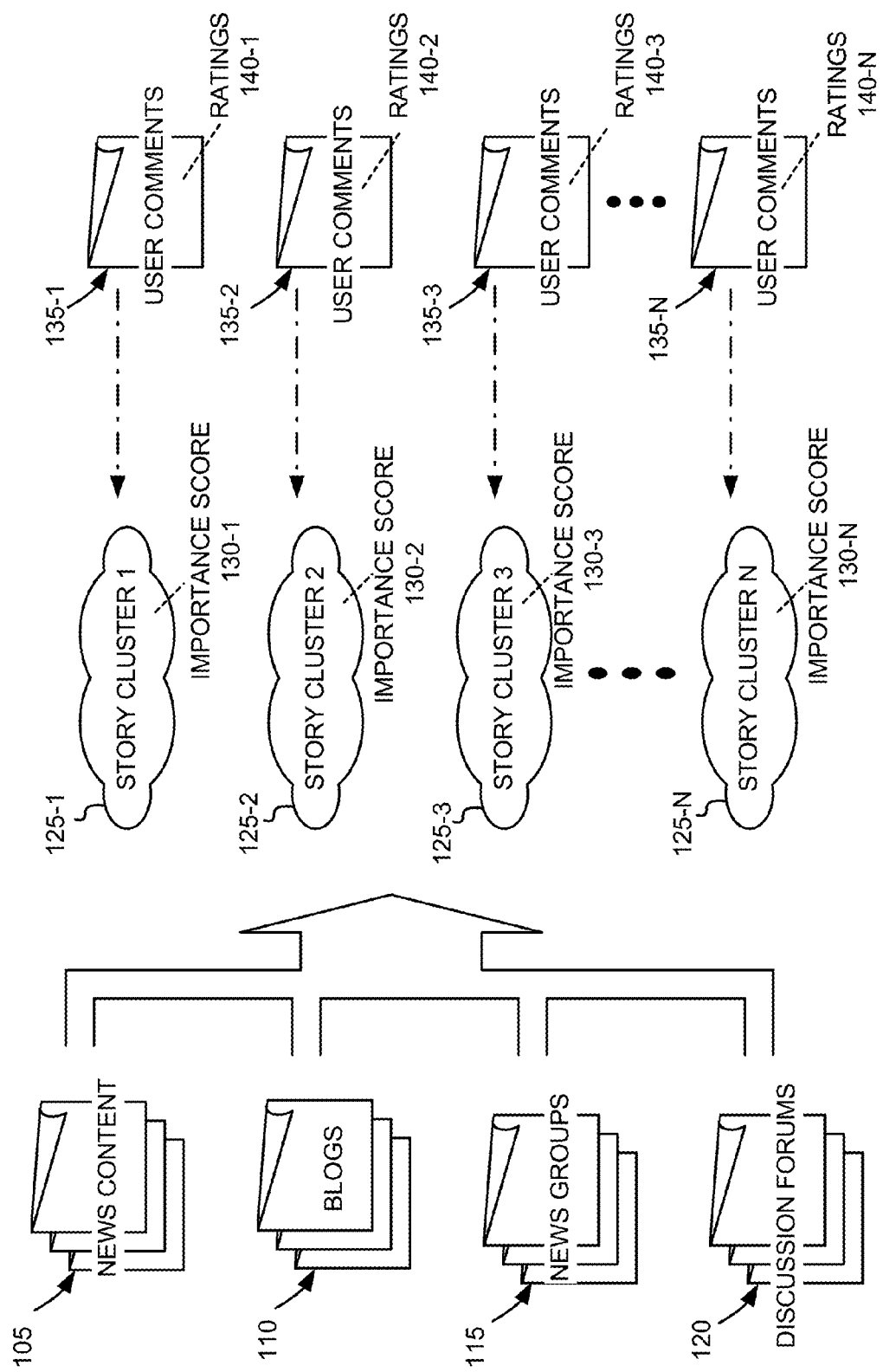
FIG. 1 is a diagram of an exemplary overview consistent with aspects of the invention.

FIG. 1 illustrates an overview of an exemplary aspect of the invention. In accordance with this aspect of the invention, news-related data from multiple different genres of document sources may be fetched, copied and aggregated. Such different genres may, for example, include news content documents 105, blog documents 110, news groups documents 115, and discussion forum documents 120. The aggregated news-related data from the multiple different genres of sources may be grouped, using clustering techniques, to create multiple story clusters 125-1 through 125-N. Each story cluster 125 may include one or more documents related to a same news related event or issue. Each story cluster 125 may further include documents from multiple different genres of documents sources. For example, a given story cluster may include documents from news source server(s) 230, news groups server(s) 240, blog server(s) 250, and discussion forum server(s) 270. As an illustrative example, a story cluster may include documents, from different genres of document sources, about the Washington Redskins hiring Joe Gibbs as head coach.

An importance score 130 may be assigned to each story cluster 125. An importance score 130 may be assigned to a respective story cluster 125 based on, among other factors, a number of independent documents authored on a subject, a freshness of documents included in the cluster, an importance of corresponding sources from which the documents were retrieved, and the genre of corresponding sources from which the documents were retrieved.

Users accessing the story clusters 125 may post comments 135 that contain the users' reactions and comments to the issues or events contained in a respective story cluster 125. The posted user comments 135 may be associated with its respective story cluster 125 so that subsequent users may access both the story cluster 125 and the associated user comments 135. These subsequent users may rate 140 the user comments based on the relevance, depth and/or usefulness of the user comments.

Exemplary Network Configuration

Figure 2:
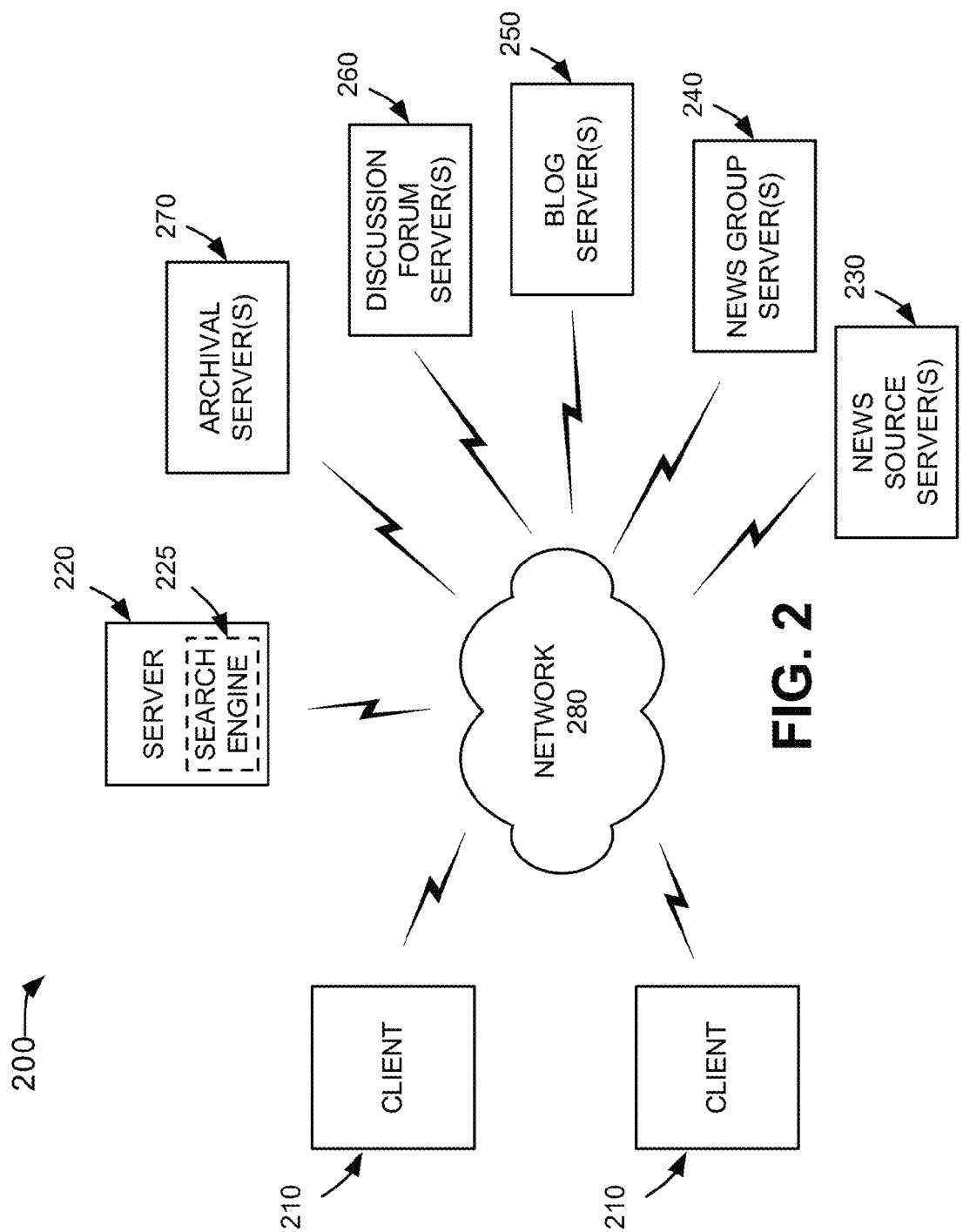
FIG. 2 is a diagram of an exemplary network in which systems and methods consistent with the principles of the invention may be implemented.

FIG. 2 is an exemplary diagram of a network 200 in which systems and methods consistent with the principles of the invention may be implemented. Network 200 may include multiple clients 210 connected to multiple servers 220-270 via a network 280. Network 280 may include a local area network (LAN), a wide area network (WAN), a telephone network, such as the Public Switched Telephone Network (PSTN), an intranet, the Internet, a memory device, another type of network, or a combination of networks. Two clients 210 and six servers 220-270 have been illustrated as connected to network 280 for simplicity. In practice, there may be more or fewer clients and servers. Also, in some instances, a client may perform the functions of a server and a server may perform the functions of a client.

Clients 210 may include client entities. An entity may be defined as a device, such as a wireless telephone, a personal computer, a personal digital assistant (PDA), a laptop, or another type of computation or communication device, a thread or process running on one of these devices, and/or an object executable by one of these devices. Servers 220-270 may include server entities that gather, process, search, and/or maintain documents in a manner consistent with the principles of the invention. Clients 210 and servers 220-270 may connect to network 280 via wired, wireless, and/or optical connections.

In an implementation consistent with the principles of the invention, server 220 may include a search engine 225 usable by users at clients 210. Server 220 may implement a content aggregation service by crawling a corpus of documents (e.g., web pages) hosted on server(s) 230-270 and store information associated with these documents in a repository of crawled documents.

News source server(s) 230 may store or maintain news content documents that may be crawled by server 220. Such news content documents may include recently published news stories, or older (i.e., not recent), archived news stories. Server(s) 230 may store or maintain news-related documents from any type of news source, such as, for example, the Washington Post, the New York Times, Time magazine, or Newsweek.

News group server(s) 240 may store or maintain documents related to any given topic or subject that may be crawled by server 220. News group server(s) 240 may allow members to post data related to the news group's topic or subject on server 240, which may then be accessed by other members of the news group.

Blog server(s) 250 may store documents containing one or more "blogs" that may be crawled by server 220. A blog may include a collaborative space where multiple users may post data on an on-going basis. Such posted data may include, for example, informative data, opinion or commentary, or any other type of data that a user wishes to post in the collaborative space.

Discussion forum server(s) 260 may store documents, that may be crawled by server 220, containing interactive discussions that occur between multiple users regarding any given topic or subject. For example, one discussion forum may include a dialogue between multiple users regarding an upcoming political election. Another discussion forum may include, for example, a discussion between multiple users regarding world events, such as the "War on Terror." A given discussion forum server 260 may host discussions on multiple different events or issues.

Archival server(s) 270 may store and maintain story clusters, aggregated from multiple different genres of news-related sources and classified into one or more taxonomies. Archival server(s) 270 may store a given story cluster and its associated classifications. Server 220 may access and retrieve archived story clusters from archival server(s) 270.

While servers 220-270 are shown as separate entities, it may be possible for one or more of servers 220-270 to perform one or more of the functions of another one or more of servers 220-270. For example, it may be possible that two or more of servers 220-270 are implemented as a single server. It may also be possible for a single one of servers 220-270 to be implemented as two or more separate (and possibly distributed) devices.

Exemplary Client/Server Architecture

Figure 3:
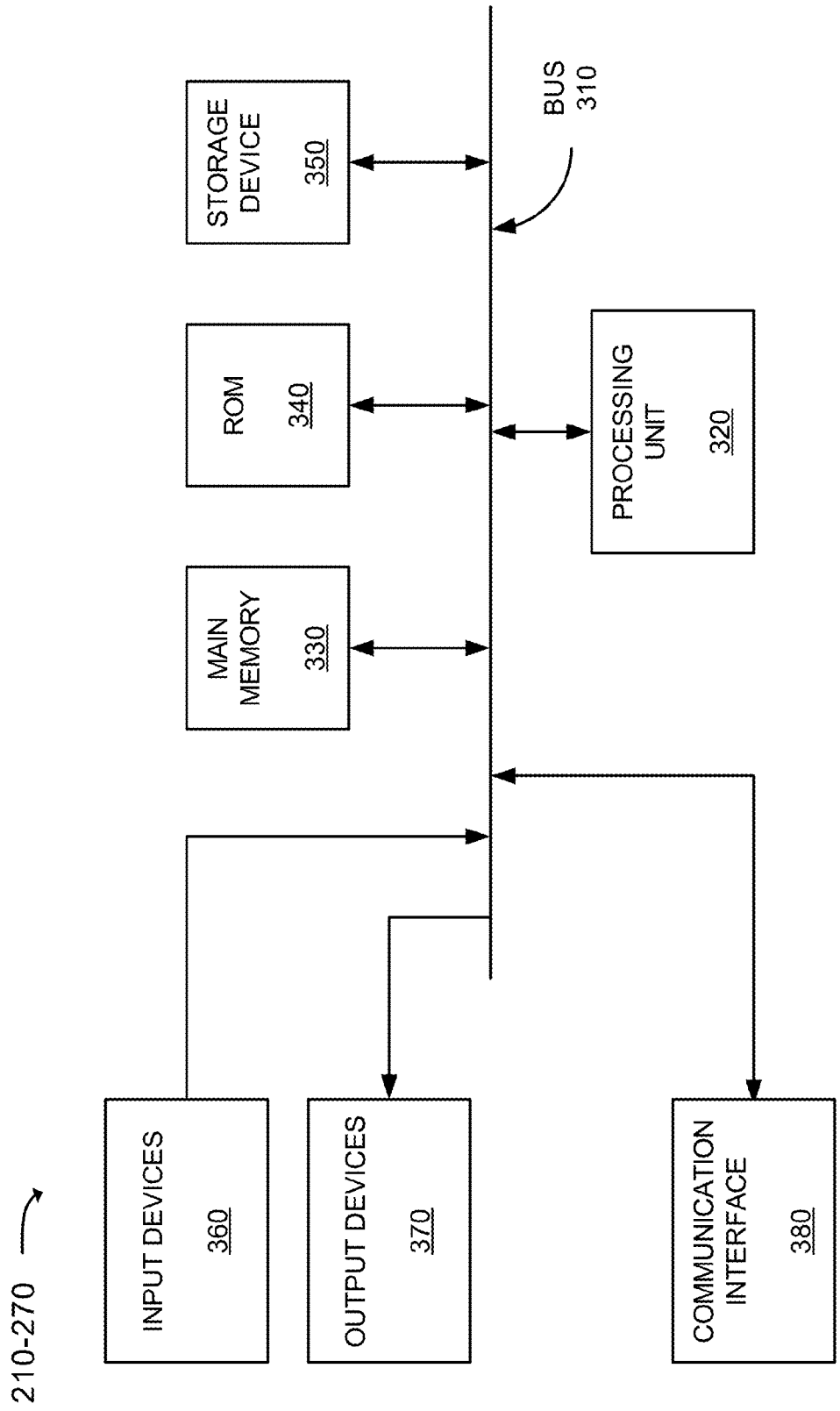
FIG. 3 is an exemplary diagram of a client and/or server of FIG. 2 in an implementation consistent with the principles of the invention.

FIG. 3 is an exemplary diagram of a client or server entity (hereinafter called "client/server entity"), which may correspond to one or more of clients 210 and servers 220-270, according to an implementation consistent with the principles of the invention. The client/server entity may include a bus 310, a processing unit 320, an optional main memory 330, a read only memory (ROM) 340, a storage device 350, input devices 360, output devices 370, and a communication interface 380. Bus 310 may include a path that permits communication among the components of the client/server entity.

Processing unit 320 may include any type of software, firmware or hardware implemented processing device, such as, a microprocessor, a field programmable gate array (FPGA), combinational logic, etc. Main memory 330 may include a random access memory (RAM) or another type of dynamic storage device that stores information and instructions for execution by processing unit 320, if processing unit 320 includes a microprocessor. ROM 340 may include a conventional ROM device or another type of static storage device that stores static information and/or instructions for use by processing unit 320. Storage device 350 may include a magnetic and/or optical recording medium and its corresponding drive.

Input devices 360 may include conventional mechanisms that permit an operator to input information to the client/server entity, such as a keyboard, a mouse, a pen, voice recognition and/or other biometric mechanisms, etc. Output devices 370 may include conventional mechanisms that output information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 280.

As will be described in detail below, the client/server entity, consistent with the principles of the invention, may perform certain data storage and retrieval operations. The client/server entity may, in some implementations, perform these operations in response to processing unit 320 executing software instructions contained in a computer-readable medium, such as memory 330. A computer-readable medium may be defined as one or more physical or logical memory devices and/or carrier waves.

The software instructions may be read into memory 330 from another computer-readable medium, such as data storage device 350, or from another device via communication interface 380. The software instructions contained in memory 330 may cause processing unit 320 to perform processes that will be described later. Alternatively, hardwired circuitry may be used in place of, or in combination with, software instructions to implement processes consistent with the principles of the invention. Thus, implementations consistent with principles of the invention are not limited to any specific combination of hardware circuitry and software.

Exemplary Story Cluster Data Table

FIG. 4 illustrates an exemplary story cluster data table 405 that may be stored in main memory 330, ROM 340 or storage device 350 of server 220. Data table 405 may include multiple entries 410, each of which may include a story cluster identifier 415 and associated comments and/or ratings corresponding to identified users 420-1 through 420-M. Each story cluster 415 in data table 405 may be associated with comments and/or ratings received from multiple users 420-1 through 420-M. The comments received from a respective user may include commentary directed to the content of a corresponding story cluster 415. The ratings received from a respective user may include some type of qualitative or quantitative rating the expresses the user's opinion about the content of a corresponding story cluster 415.

As an illustrative example, FIG. 4 depicts comments and ratings having been received from users 1 420-1 and 2 420-2 for story cluster CLUSTER_1, and no comments having been received from users 3 420-3 and M 420-M. FIG. 4 similarly depicts comments and ratings that have been received from users 1 420-1 through M 420-M for story clusters CLUSTER_2 through CLUSTER_N.

Exemplary Document Aggregation Process

Figure 5:
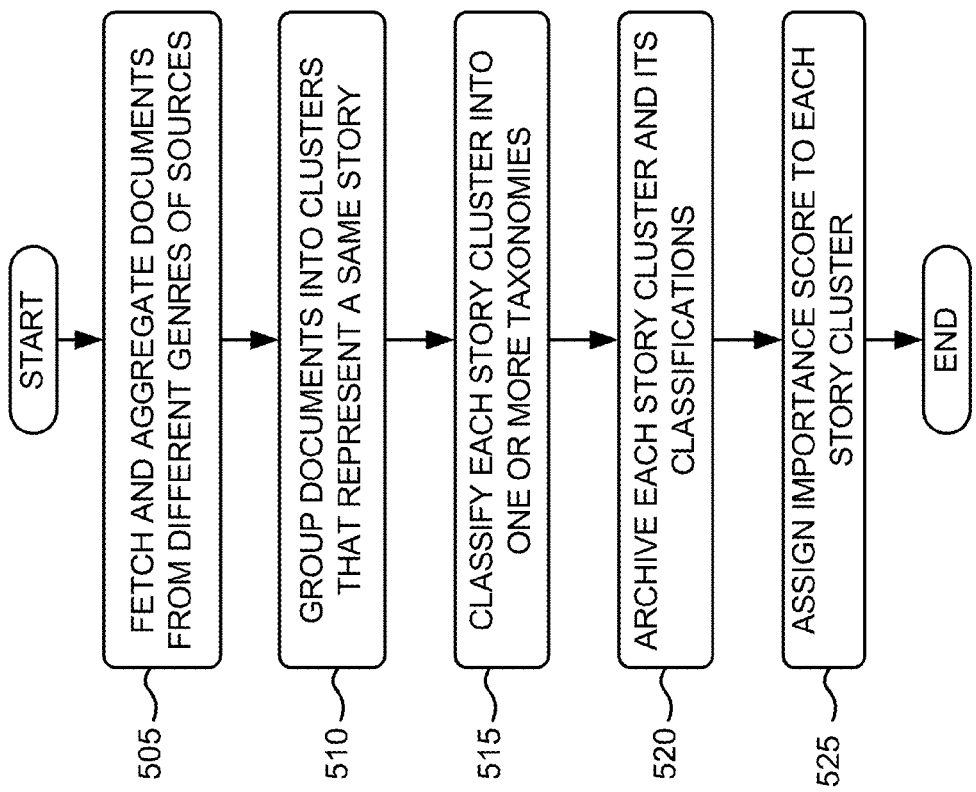
FIG. 5 is a flowchart of an exemplary process for aggregating, clustering, classifying and scoring documents fetched from different genres of data sources according to an implementation consistent with the principles of the invention.

FIG. 5 is a flowchart of an exemplary process for aggregating, clustering, classifying, scoring and archiving news-related content fetched from multiple different genres of data sources. As one skilled in the art will appreciate, the processing exemplified by FIG. 5 can be implemented in software and stored on a computer-readable memory, such as main memory 330, ROM 340 or storage device 350 of server 220. Alternatively, the process exemplified by FIG. 5 can be implemented in hardwired circuitry, such as combinational logic, within server 220. The exemplary acts of FIG. 5 may be performed entirely by server 220. In other implementations, however, some of the exemplary acts of FIG. 5 may be performed by other devices, such as client 210, or one or more of servers 230-270.

The exemplary process may begin with fetching and aggregating documents from different genres of data sources (act 505). The different genres of sources may include, for example, news sources (e.g., news source server(s) 230), news groups (e.g., news group server(s) 240), blogs (e.g., blog server(s) 250), and discussion forums (e.g., discussion forum server(s) 260). The different genres of sources may also include sources storing amateur photojournalism, television news reports, audio news reports, audio blogs, and eyewitness amateur video reports. To aggregate documents from the different genres of data sources, server 220 may "crawl" a corpus of documents hosted on server(s) 230-270 and store information associated with these documents in a repository of crawled documents. Published content, such as, for example, content from news source documents, may, thus, be aggregated in a repository with commentary/interactive/modifiable content, such as, for example, content from news group documents, blogs and/or discussion forum documents.

The aggregated documents may be grouped into clusters, with each cluster representing a same "story" (act 510). A "story" may include data related to a same news-related topic (e.g., a same event or issue in the news). The aggregated documents may be grouped using one or more existing clustering techniques. Each story cluster may include different types of genres of document sources. For example, a given story cluster may include a news content document and interactive/modifiable documents, such as, for example, news groups, blogs, or discussion forum documents, that include commentary related to the news content document. Each story cluster may then be classified into one or more taxonomies (act 515). The taxonomies in a given classification scheme may represent issues or events that recur in the news. The classifications may be determined, for example, by manual tagging, by machine classification, or by other types of data classification techniques, or combinations of classification techniques. As an illustrative example, multiple taxonomies may represent a story cluster about a drug scandal in the 2004 Olympics affecting a weight lifter as follows:
Society>Afflictions>Addiction>Drugs
Events>Sporting Events>Olympics>Olympics 2004
Sports>Individual>Weight Lifting
Geography>Europe>Greece>Athens
Time>21$^{st}$ Century>2004>August
Each story cluster may further be archived, in archival server(s) 270, along with its classifications (act 520). The classifications associated with each story cluster may be subsequently used to retrieve stories by composing a suitable query. The classifications associated with the story clusters further permit the presentation of archived news-related data in a structured and browseable fashion.

An importance score may be assigned to each story cluster (act 525). An importance score may be assigned to each story cluster based on, among other factors, a number of independent news documents authored on the story cluster, the freshness of the documents of the story cluster, the importance of the source from which the documents of the story cluster were retrieved, and the genre of the source from which the documents of the story cluster were retrieved. Consistent with one aspect, documents from professional news sources may be scored higher than documents from blogs, and documents from blogs may be scored higher than documents from lay users. In another aspect, the importance of the different genres of data sources may be assessed based on user selections aggregated over time (i.e., based on the popularity of the genre).

Exemplary Story Cluster User Comment Aggregation Process

Figure 6B:
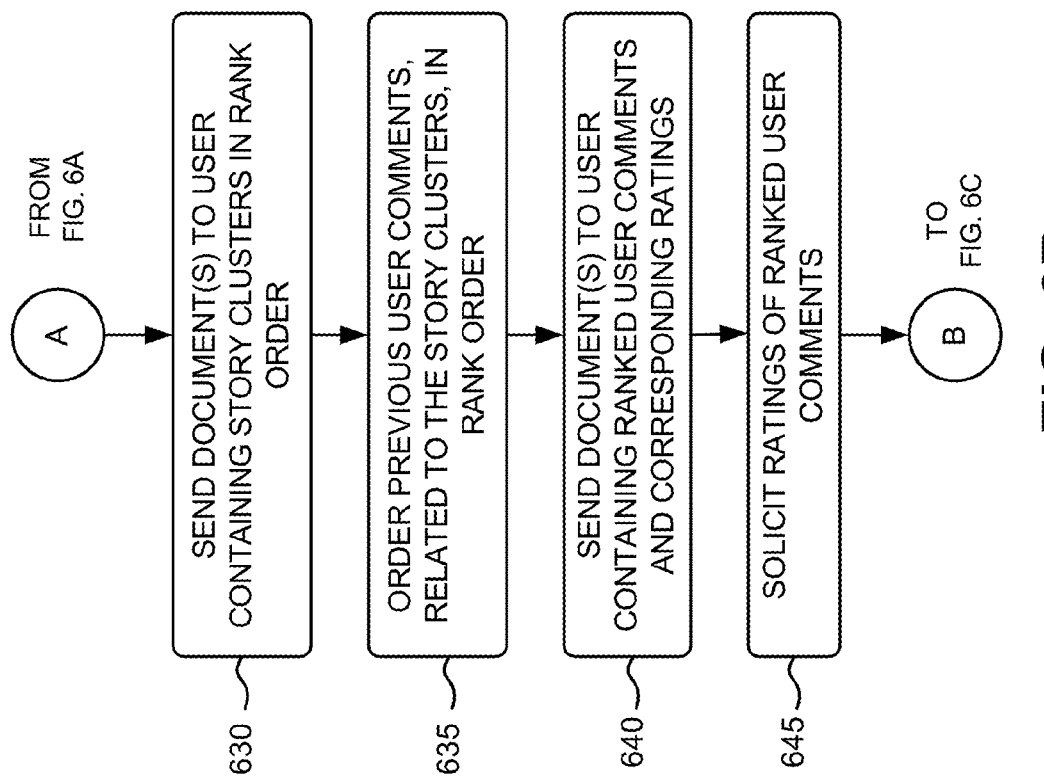
Figure 6C:
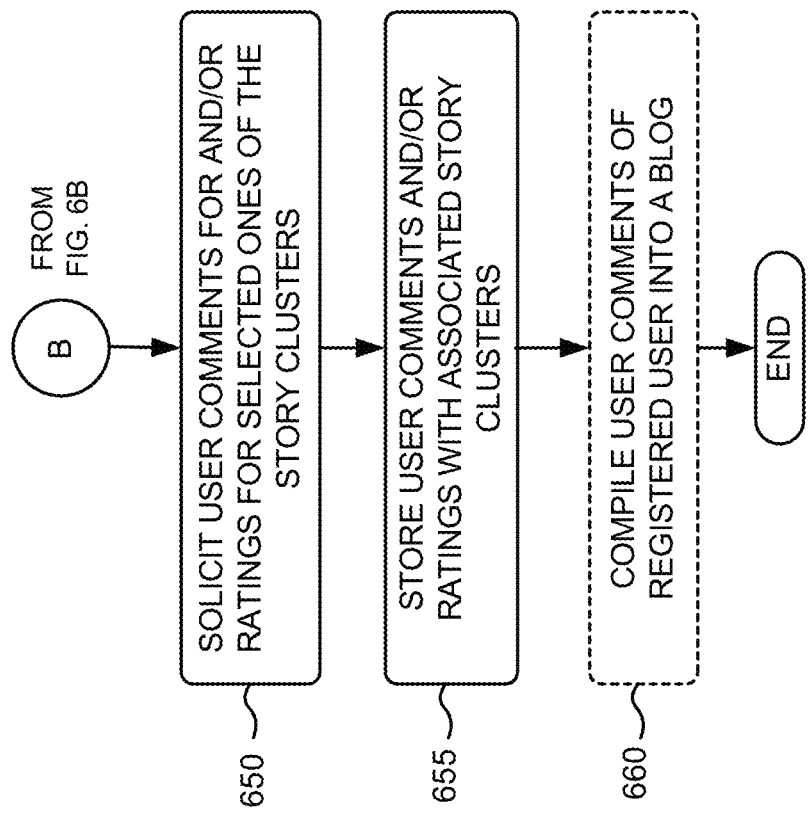

FIGS. 6A, 6B and 6C are flowcharts of an exemplary process for aggregating user comments on story clusters according to an implementation consistent with principles of the invention. As one skilled in the art will appreciate, the processing exemplified by FIGS. 6A-6C can be implemented in software and stored on a computer-readable memory, such as main memory 330, ROM 340 or storage device 350 of server 220. Alternatively, the process exemplified by FIGS. 6A-6C can be implemented in hardwired circuitry, such as combinational logic, within server 220. The exemplary acts of FIGS. 6A, 6B and 6C may be performed entirely by server 220. In other implementations, however, some of the exemplary acts of FIGS. 6A, 6B and 6C may be performed by other devices, such as client 210, or one or more of servers 230-270.

The exemplary process may optionally begin with the receipt of a user registration (act 605)(FIG. 6A). Registration may include, for example, the creation of an account through the provision of user identification information and selection of a user login and password. Optionally, the registered user may then be selectively "accredited" (act 610). Accreditation may include authentication of certain registered users for the purpose of according such users privileged status. For example, professional journalists, bloggers, famous people and people mentioned in the news may be registered, authenticated, and designated as "accredited." Subsequent user comments received from such accredited users may be accorded special credence.

Figure 7:
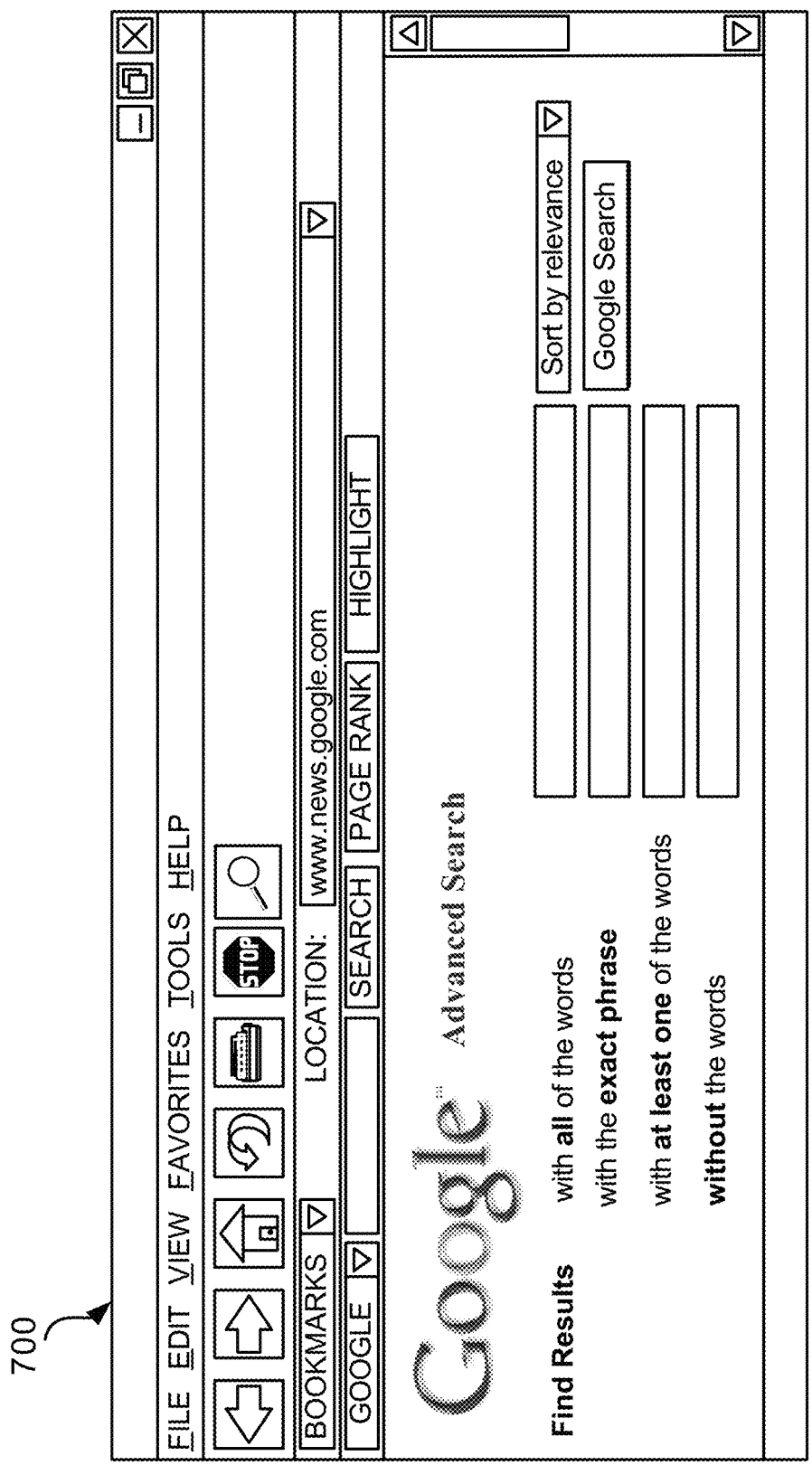
FIG. 7 is a diagram of an exemplary search document according to an implementation consistent with the principles of the invention.

A search query may be received (act 615). A user at a client 210 may compose a search query composed, for example, of various search terms related to a news-related event or issue of interest to the user. In one implementation, the various search terms may be interrelated through the use of Boolean operators (i.e., AND, OR, NOT, etc.). As an illustrative example, a user desiring to search story clusters regarding a drug scandal involving a weight lifter at the 2004 Olympics may compose the search query "drugs AND weight lifting AND Olympics" to retrieve one or more pertinent story clusters. FIG. 7 illustrates an exemplary search entry document 700, consistent with one implementation of the invention, in which terms or phrases may be entered into fields such as "with all of the words," "with the exact phrase," "with at least one of the words," or "without the words."

The received search query may be executed by search engine 225 to retrieve story clusters corresponding to the query (act 620). In one implementation, server 220 may retrieve archived story clusters from archival server(s) 270 based on the executed search query. The retrieved story clusters may be ordered in rank order based on importance scores previously assigned to each of the story clusters (act 625). Story clusters with higher importance scores may, thus, be ranked higher than story clusters with lower importance scores. The importance scores may have been assigned as described above with respect to act 525 of FIG. 5.

Figure 8:
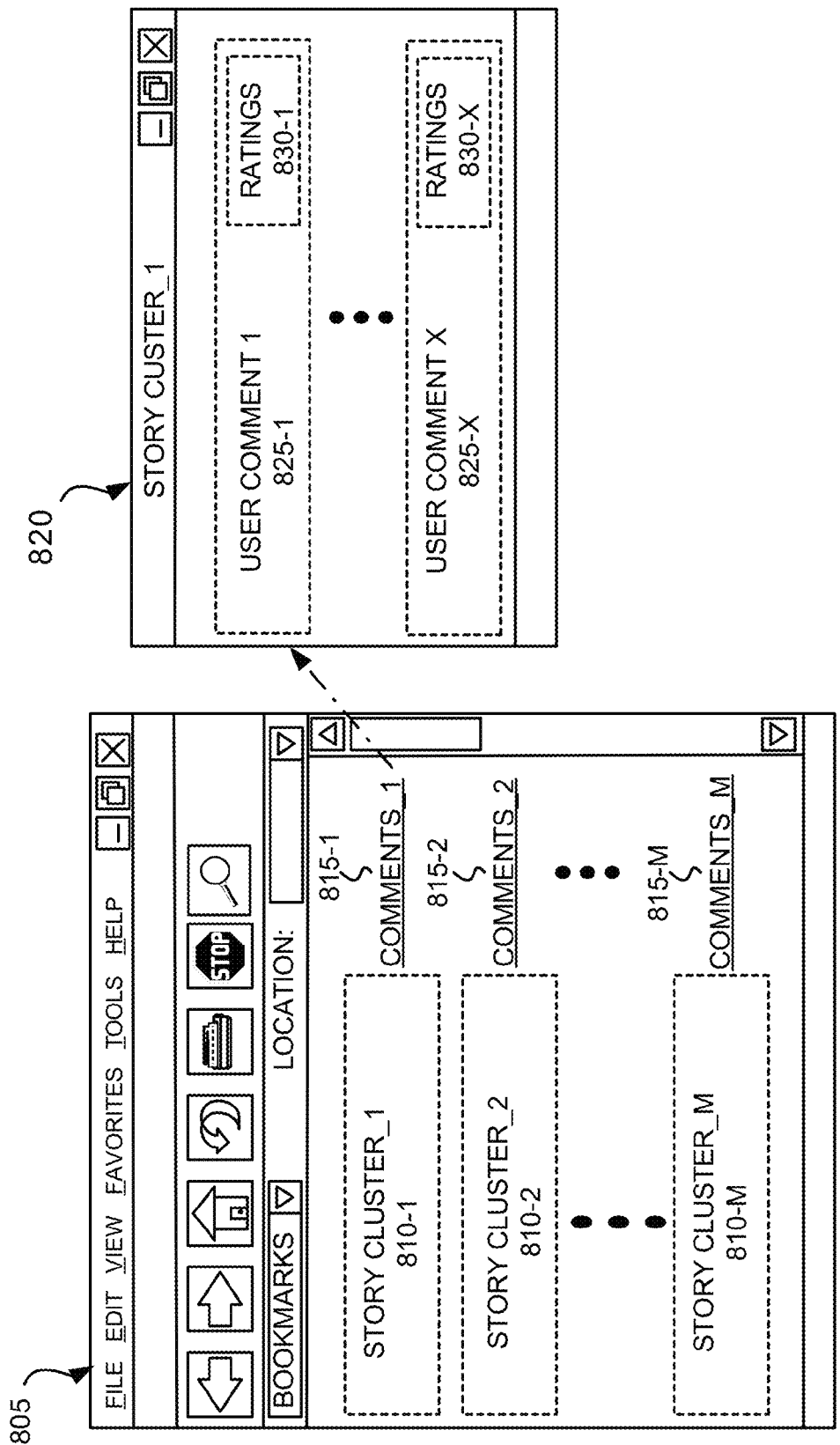
FIG. 8 is a diagram of an exemplary story cluster document and user comment document according to an implementation consistent with the principles of the invention.

Document(s), containing story clusters in rank order, may be sent to the user (act 630)(FIG. 6B). Each document sent to the user may include multiple news articles for each story cluster, with each article being visually separated to distinguish individual genres. Thus, for example, articles from a news source server may be visually separated from articles from blogs. In one implementation, professional news articles may be shown before blogs, which may in turn be shown before articles from discussion boards. In another implementation, articles from different genres may be shown intermixed, but each source name may be displayed in a font and/or color that identifies its genre. FIG. 8 illustrates an exemplary implementation in which a first document 805 displays story clusters 810-1 through 810-M and corresponding links to associated comments 815-1 through 815-M. Each story cluster 810 may include one or more different news-related articles.

Previously received user comments, related to the story clusters, may be ordered in rank order (act 635). User comments may be ordered based on the accreditation of the user that posted the comments, the freshness of the comments, or the ratings given by other users reading the comments. Comments posted by accredited users may, thus, be ranked before postings by registered users, and postings by registered users may be ranked before postings by unregistered users. The ordering of user comments may further be determined by ratings given to the comments by other users and/or by the "freshness" (e.g., how recent) of the posted comments. Additionally, in one implementation, comments posted by accredited journalists, bloggers or individuals who are named or mentioned in one of the articles of the story cluster may be ranked higher than comments from other individuals (e.g., a comment posted by the Chairman of the Securities and Exchange Commission on a story related to the stock market may be ranked higher than comments from other users).

Document(s), containing the ranked user comments and corresponding ratings, may be sent to the user (act 640). As shown in the illustrative example of FIG. 8, upon selection of one of the links to a comment 815 in document 805, a second document 820 may display multiple user comments 825-1 through 825-X associated with a respective story cluster 810. Additionally, user ratings 830 may be associated with each of the user comments 825.

Ratings for the ranked user comments may be solicited from the current user at client 210 (act 645). The current user may rate the ranked user comments for, among other factors, relevance, depth and usefulness. For example, comments that are highly relevant to a story cluster may be rated accordingly by a user. As another example, user comments that have a lot of substance and "depth" may be rated highly by a user. User comments and/or ratings for each story cluster may be solicited from the current user at client 210 (act 650)(FIG. 6C). The user at client 210 may compose comments related to a content of designated story clusters received from server 220 and send the comments to server 220. The user at client 210 may additionally provide a qualitative or quantitative rating that relates to a content of designated story clusters received from server 200 and send the comments to server 220. Solicited comments and/or ratings received from the user at client 210 may be stored with associated story clusters (act 655). For example, solicited comments and/or ratings may be stored in story cluster data table 405 in an appropriate entry 410 that corresponds to the story cluster 415 and user identifier 420 of the user providing the comments and/or ratings. Optionally, comments of the user, if registered, may be compiled into a blog (act 660). The blog may be hosted by server 220, or by another server. Compilation of user comments into the blog may encourage lay users to become "bloggers" and build a reputation. Furthermore, ratings of user comments may be used to encourage all authors to write responsible comments.

Exemplary News Round Table Custom View Creation Process

Figure 9:
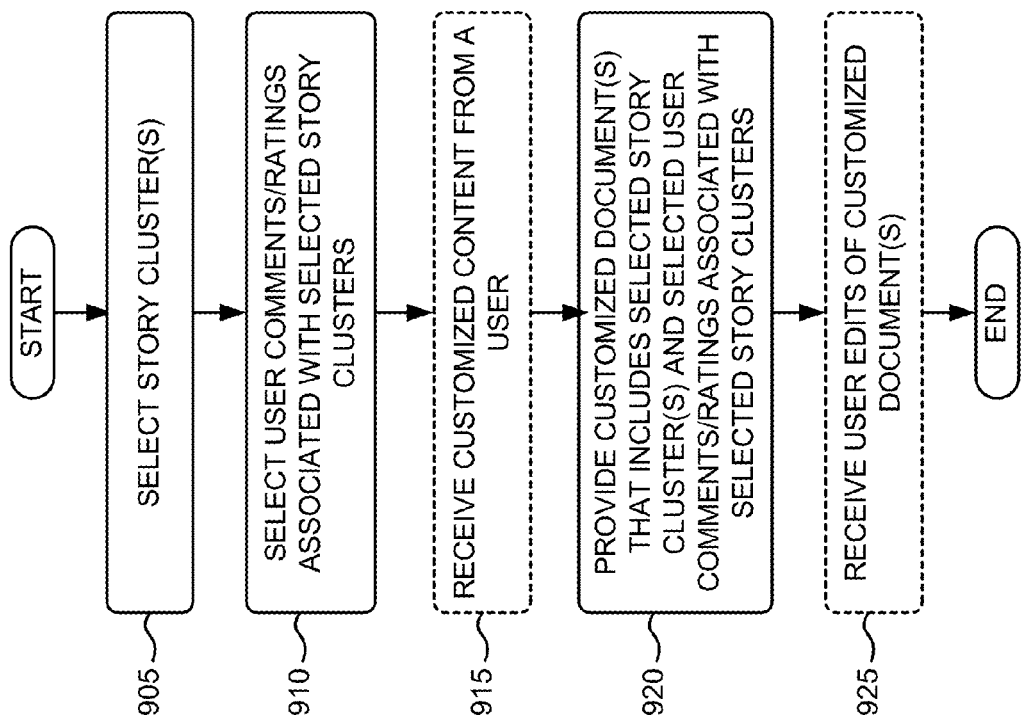
FIG. 9 is a flowchart of an exemplary news round table custom view creation process consistent with principles of the invention.

FIG. 9 is a flowchart of an exemplary process for creating a custom view of the news round table according to an implementation consistent with principles of the invention. The exemplary process of FIG. 9 enables a given user to serve as an editor of his own custom view of the news round table. As one skilled in the art will appreciate, the processing exemplified by FIG. 9 can be implemented in software and stored on a computer-readable memory, such as main memory 330, ROM 340 or storage device 350 of server 220. Alternatively, the process exemplified by FIG. 9 can be implemented in hardwired circuitry, such as combinational logic, within server 220. The exemplary acts of FIG. 9 may be performed entirely by server 220. In other implementations, however, some of the exemplary acts of FIG. 9 may be performed by other devices, such as client 210, or one or more of servers 230-270.

The exemplary process may begin with the selection of one or more story clusters (act 905). Server 220 may receive indications of the selected story clusters from an identified user at a client 210. The user at client 210 may, for example, select highly rated story clusters, or story clusters that the user believes are significant or important. User comments/ratings associated with the selected story clusters may also be selected (act 910). Server 220 may receive indications of the selected user comments/ratings associated with the selected story clusters from the identified user at client 210. The user may, for example, select, from all of the comments/ratings associated with a selected story cluster, particular comments and/or ratings that the user believes are significant, important, or representative of many of the comments for a respective story cluster. The selected comments/ratings may include the user's own comments/ratings previously aggregated in, for example, data table 405.

Figure 10:
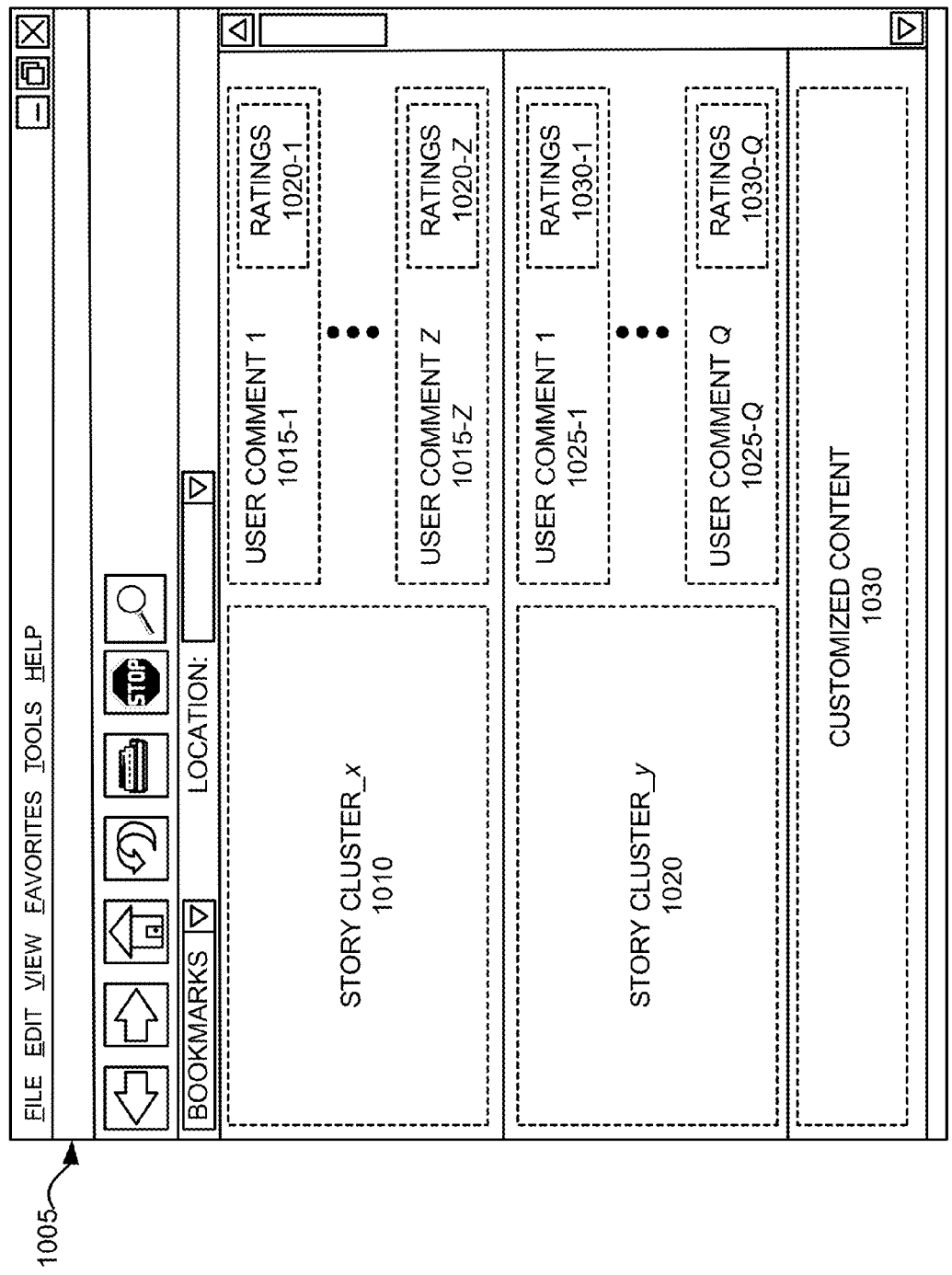
FIG. 10 is a diagram of an exemplary customized news round table document consistent with an aspect of the invention.

Customized content may, optionally, be received from a user (act 915). The customized content may include additional commentary provided by the user at client 210, or other content that the user desires to "publish" along with the story clusters and commentary that the user has selected, such as, for example, the user's own "news story" related to a particular story cluster. One or more customized documents may then be provided that include the selected story clusters, and the selected comments/ratings associated with the selected story clusters (act 920). Server 220 may aggregate the story clusters selected by the user, and the associated user comments/ratings selected by the user, and place the content in one or more documents. Server 220 may additionally place the customized content (act 915 above), received from the user, into the one or more documents. The customized documents provided by server 220 may be hosted on a server, such as servers 220-270, for access by other users. FIG. 10 illustrates an exemplary customized document 1005 that includes two story clusters 1010 and 1020 selected by a user for inclusion in the user's personal "view" of the news round table. The customized document 1005 additionally includes selected user comments 1015 and ratings 1020 associated with story cluster STORY CLUSTER_x and comments 1025 and ratings 1030 associated with story cluster STORY CLUSTER_y. As shown in FIG. 10, customized document 1005 may further include customized content 1030, provided by the user, that the user desires to have published with the selected story clusters.

User edits of the customized documents may, optionally, be received (act 925). The user that selected that content of the customized documents may edit the content or the format of the customized documents prior to, or after, the documents have been hosted on servers 220-270.

The exemplary process of FIG. 9, thus, permits users to create and share their own personal "view" of the news round table. Users may, therefore, create customized documents, that may be made available to multiple other users, that include the user's own "news edition" containing news content and associated commentary selected by the user.

Exemplary Implementation

Figure 11:
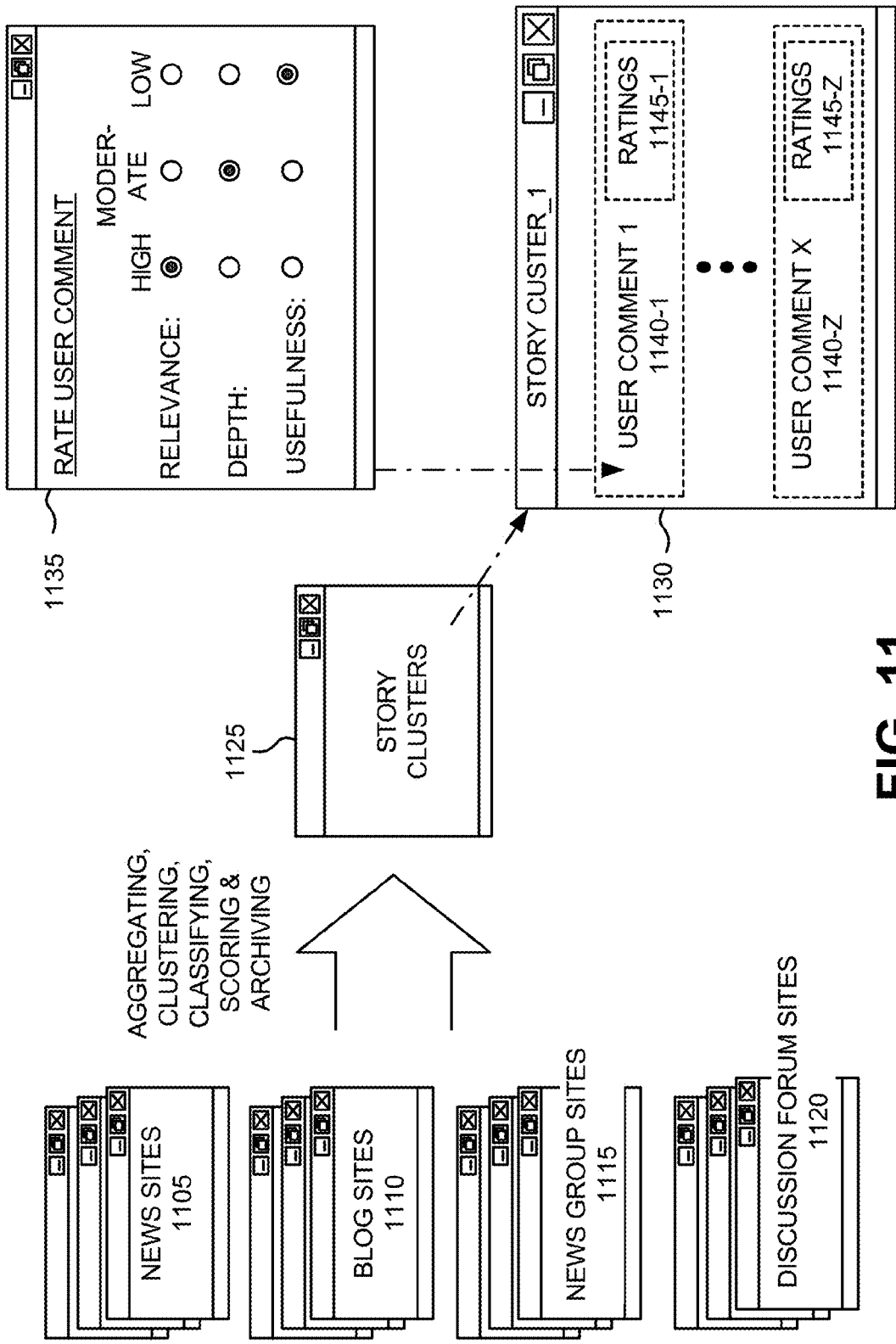
FIG. 11 is a diagram of an exemplary implementation consistent with principles of the invention.

FIG. 11 illustrates an exemplary implementation in which the different genres of news-related sources consist of web pages stored at web servers in the Internet. In this implementation, the different genres of sources may include news source sites 1105, blog sites 1110, news group sites 1115 and discussion forum sites 1120. As described above with respect to FIG. 5, the content of the sites 1105-1120 may be aggregated, clustered, classified, scored and then archived. The resulting story clusters may be provided to users via one or more web pages 1125. Comments received from users and associated with the content of each of the story clusters may further be provided via another web page 1130. Web page 1130 may include multiple users comments 1140-1 through 1140-Z and associated ratings 1145-1 through 1145-Z. Users viewing selected ones of the user comments 1140 may rate the comments for relevance, depth and/or usefulness via a ratings web page 1135.

CONCLUSION

The foregoing description of preferred embodiments of the invention provides illustration and description, but is not intended to be exhaustive or to limit the invention to the precise form disclosed. Modifications and variations are possible in light of the above teachings or may be acquired from practice of the invention. For example, while series of acts have been described with regard to FIGS. 5, 6A, 6B, 6C, and 9, the order of the acts may be modified in other implementations consistent with the principles of the invention. Also, non-dependent acts may be performed in parallel. Aspects of the invention have been described as grouping news content from different genres of sources into story clusters, and receiving commentary and ratings corresponding to each of the story clusters. One skilled in the art, however, will recognize that the aspects of the invention described above with respect to FIGS. 5, 6A-6C and 9 may also be applied to individual news articles, and not just grouped clusters of news articles. Thus, for example, comments may be accumulated from multiple users with respect to a given individual news article and a customized document(s) may be created that includes individual news articles, and not just story clusters, selected by a user.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computer-implemented method comprising:
   receiving, by one or more processors, a search query from a user device via a network;
   determining, by the one or more processors and based on the search query, clusters of documents that are associated with the search query, the clusters of documents being related to different topics;
   providing on a graphical user interface of a user device, by the one or more processors and for presentations in a first section of a document, information regarding a plurality of the clusters of documents, the information identifying one or more respective documents associated with each cluster of the plurality of clusters of documents, and the one or more respective documents being aggregated from different genres and being related to a common topic;
   providing on the graphical user interface of the user device, by the one or more processors and for presentation in a second section of the document, user comments from a first user related to at least one cluster of the plurality of clusters of documents, wherein the first section of the document is different from the second section of the document;
   receiving, by the one or more processor, a rating from a second user for the user comments, where the rating is based on a relevance, depth, or usefulness of at least one user comment;
   providing, by the one or more processor, a discussion forum for the user comments, the discussion forum allowing a second user to comment on the user comments;
   ranking, by the one or more processors and for presentation in the second section of the document, the user comments based on the rating from the second user, wherein the ranking the user comments further comprises: ranking comments of the user comments, posted by users who are named in a document of at least one cluster of the plurality of clusters of documents, higher than comments of the user comments that are posted by users who are not named in a document of the at least one cluster; and
   receiving the user comments related to the clusters of documents; and storing, in a memory of a computer, the received user comments.

2. The method of claim 1, where providing the user comments comprises: ranking the user comments; and providing, for presentation, the ranked user comments.

3. The method of claim 2, where ranking the user comments comprises:
   determining whether users corresponding to the user comments are accredited users or unaccredited users; and
   ranking the user comments corresponding to the accredited users higher than the user comments corresponding to the unaccredited users.

4. The method of claim 2, where ranking the user comments comprises: ranking the user comments based on a measure of freshness associated with the user comments.

5. The method of claim 1, further comprising: receiving one or more comments related to the clusters of documents; and storing, in the memory, the received one or more comments.

6. The method of claim 5, further comprising: compiling the received one or more comments into a blog.

7. A device comprising:
   a memory to store instructions; and a processor to execute the instructions to:
   receive a search query from a user device via a network;
   determine, based on the search query, clusters of documents that are associated with the search query, the clusters of documents being related to different topics;

provide on a graphical user interface of the user device, for presentation in a first section of a document, information regarding a plurality of the clusters of documents, the information identifying one or more respective documents associated with each cluster of the plurality of clusters of documents, and the one or more respective documents being aggregated from different genres and being related to a common topic;

provide on the graphical user interface of the user device, for presentation in a second section of the document, user comments from a first user related to at least one cluster of the plurality of clusters of documents, wherein the first section of the document is different from the second section of the document;

receive a rating from a second user for the user comments, where the rating is based on a relevance, depth, or usefulness of at least one user comment;

provide a discussion forum for the user comments, the discussion forum allowing a second user to comment on the user comments;

rank, for presentation in the second section of the document, the user comments based on the rating from the second user, wherein the ranking the user comments further comprises: rank comments of the user comments, posted by users who are named in a document of at least one cluster of the plurality of clusters of documents, higher than comments of the user comments that are posted by users who are not named in a document of the at least one cluster; and receive the user comments related to the clusters of documents; and storing, in a memory of a computer, the received user comments.

8. The device of claim 7, where, when providing the user comments, the processor is further to: rank the user comments; and provide, for presentation, the ranked user comments.

9. The device of claim 8, where, when ranking the user comments, the processor is further to: determine whether users corresponding to the user comments are accredited users or unaccredited users; and
rank the user comments corresponding to the accredited users higher than the user comments corresponding to the unaccredited users.

10. The device of claim 8, where, when ranking the user comments, the processor is further to: rank the user comments based on a measure of freshness associated with the user comments.

11. The device of claim 7, where the processor is further to: receive one or more comments related to the clusters of documents; and store the received one or more comments.

12. The device of claim 11, where the processor is further to: compile the received on or more comments into a blog.

13. A non-transitory computer-readable storage medium storing one or more instructions which, when executed by at least one processor, cause the at least one processor to:
receive a search query from a user device via a network;
determine, based on the search query, clusters of documents that are associated with the search query, the clusters of documents being related to different topics;
provide on a graphical user interface of the user device, for presentation in a first section of a document, information regarding a plurality of the clusters of documents, the information identifying one or more respective documents associated with each cluster of the plurality of clusters of documents, and the one or more respective documents being aggregated from different genres and being related to a common topic;

provide on the graphical user interface of the user device, for presentation in a second section of the document, user comments from a first user related to at least one cluster of the plurality of clusters of documents, wherein the first section of the document is different from the second section of the document;

receive a rating from a second user for the user comments, where the rating is based on a relevance, depth, or usefulness of at least one user comment;

provide a discussion forum for the user comments, the discussion forum allowing a second user to comment on the user comments;

rank, for presentation in the second section of the document, the user comments based on the rating from the second user, wherein the ranking the user comments further comprises: rank comments of the user comments, posted by users who are named in a document of at least one cluster of the plurality of clusters of documents, higher than comments of the user comments that are posted by users who are not named in a document of the at least one cluster; and receive the user comments related to the clusters of documents; and storing, in a memory of a computer, the received user comments.

14. The medium of claim 13, where the one or more instructions to provide the user comments include:
one or more instructions to rank the user comments; and
one or more instructions to provide, for presentation, the ranked user comments.

15. The medium of claim 14, where the one or more instructions to rank the user comments include:
one or more instructions to determine whether users corresponding to the user comments are accredited users or unaccredited users; and
one or more instructions to rank the user comments corresponding to the accredited users higher than the user comments corresponding to the unaccredited users.

16. The medium of claim 14, where the one or more instructions to rank the user comments include:
one or more instructions to rank the user comments based on a measure of freshness associated with the user comments.

17. The medium of claim 13, where the instructions further include: one or more instructions to receive one or more comments related to the clusters of documents; and one or more instructions to store the received one or more comments.

* * * * *